US010856135B2

(12) United States Patent
Wang et al.

(10) Patent No.: US 10,856,135 B2
(45) Date of Patent: Dec. 1, 2020

(54) METHOD AND APPARATUS FOR NETWORK ACCESS

(71) Applicant: Telefonaktiebolaget LM Ericsson (publ), Stockholm (SE)

(72) Inventors: Cheng Wang, Shanghai (CN); Junyi Wang, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 43 days.

(21) Appl. No.: 16/070,872

(22) PCT Filed: Sep. 29, 2016

(86) PCT No.: PCT/CN2016/100826
§ 371 (c)(1),
(2) Date: Jul. 18, 2018

(87) PCT Pub. No.: WO2017/128756
PCT Pub. Date: Aug. 3, 2017

(65) Prior Publication Data
US 2019/0036924 A1 Jan. 31, 2019

(30) Foreign Application Priority Data

Jan. 25, 2016 (WO) ................ PCT/CN2016/072016

(51) Int. Cl.
*H04W 8/18* (2009.01)
*H04W 12/06* (2009.01)
(Continued)

(52) U.S. Cl.
CPC .......... *H04W 8/18* (2013.01); *H04L 63/0892* (2013.01); *H04W 12/0609* (2019.01); *H04W 76/10* (2018.02); *H04W 84/12* (2013.01)

(58) Field of Classification Search
CPC .... H04L 63/0892; H04W 76/10; H04W 8/18; H04W 12/06; H04W 84/12
See application file for complete search history.

(56) References Cited

U.S. PATENT DOCUMENTS

| 2010/0188975 | A1* | 7/2010 | Raleigh | .................. | G06Q 40/00 370/230.1 |
| 2015/0180869 | A1* | 6/2015 | Verma | .................. | H04L 63/0838 726/4 |

FOREIGN PATENT DOCUMENTS

| CN | 103905400 A | 7/2014 |
| CN | 105162785 A | 12/2015 |

(Continued)

OTHER PUBLICATIONS

International Search Report and Written Opinion dated Dec. 23, 2016 for International Application No. PCT/CN2016/100826 Filed on Sep. 29, 2016, consisting of 7-pages.
(Continued)

*Primary Examiner* — Mohammed Waliullah
(74) *Attorney, Agent, or Firm* — Patent Portfolio Builders, PLLC

(57) ABSTRACT

A method at a Fast Identity Online, FIDO, server for facilitating a terminal device without a Subscriber Identity Module, SIM, card to access a first network via a second network. Association information for the terminal device without a SIM card is obtained indicative of an association between the terminal device without a SIM card and a user subscription account and authentication information for the terminal device without a SIM card and causes the terminal device without a SIM card to be registered with the FIDO server according to a set of FIDO Alliance specifications based at least on the association information and the authentication information. Registration information for the terminal device without a SIM card is provided to an Authenti- (Continued)

cation, Authorization, and Accounting, AAA, server, in response to receipt at the AAA server of an authentication request from the terminal device without a SIM card.

16 Claims, 13 Drawing Sheets

(51) Int. Cl.
    *H04L 29/06*     (2006.01)
    *H04W 76/10*     (2018.01)
    *H04W 84/12*     (2009.01)

(56) References Cited

FOREIGN PATENT DOCUMENTS

| EP | 2741459 A1 | 5/2014 |
|---|---|---|
| WO | 2014126518 A1 | 8/2014 |
| WO | 2014176539 A1 | 10/2014 |
| WO | 2015158263 A1 | 10/2015 |

OTHER PUBLICATIONS

3GPP TS 23.272 V13.4.0 "3rd Generation Partnership Project; Technical Specification Group Services and System Aspects; Circuit Switched (CS) fallback in Evolved Packet System (EPS); Stage 2 (Release 13)" Jun. 2016, consisting of 103-pages.

3GPP TS 23.401 V14.1.0 "3rd Generation Partnership Project; Technical Specification Group Services and System Aspects; General Packet Radio Service (GPRS) enhancements for Evolved Universal Terrestrial Radio Access Network (E-UTRAN) access (Release 14)" Sep. 2016, consisting of 379-pages.

3GPP TS 23.413 V14.0.0 "3rd Generation Partnership Project; Technical Specification Group Radio Access Network; Evolved Universal Terrestrial Radio Access Network (E-UTRAN); S1 Application Protocol (S1AP) (Release 14)" Sep. 2016, consisting of 333-pages.

Extended European Search Report dated Apr. 24, 2019 for Application No. 16887630.8, consisting of 11-pages.

FIDO Alliance Proposed Standard; Title: FIDO UAF Authenticator Commands v1.0, Dec. 8, 2014, consisting of 28-pages.

FIDO Alliance Proposed Standard; Title: FIDO U2F Implementation Considerations, May 14, 2015, consisting of 5-pages.

* cited by examiner

METHOD AND APPARATUS FOR NETWORK ACCESS

CROSS-REFERENCE TO RELATED APPLICATIONS

This application is a Submission Under 35 U.S.C. § 371 for U.S. National Stage Patent Application of International Application Number: PCT/CN2016/100826, filed Sep. 29, 2016 entitled "METHOD AND APPARATUS FOR NETWORK ACCESS," which claims priority to International Application Number: PCT/CN2016/072016, filed Jan. 25, 2016, the entireties of both of which are incorporated herein by reference.

TECHNICAL FIELD

The non-limiting and exemplary embodiments of the present disclosure generally relate to the field of communications, and specifically to methods, servers and apparatuses for facilitating a device without a Subscriber Identity Module (SIM) card to access a first network via a second network and to the device without a SIM card.

BACKGROUND

This section introduces aspects that may facilitate better understanding of the present disclosure. Accordingly, the statements of this section are to be read in this light and are not to be understood as admissions about what is in the prior art or what is not in the prior art.

Wi-Fi is a technology which enables devices (e.g. wireless devices) to exchange data or to connect to e.g. the Internet wirelessly using radio waves. Wi-Fi is considered to be a key candidate for small cell solutions for mobile broadband heterogeneous networks. Wi-Fi is mainly specified by the Institute of Electrical and Electronics Engineers (IEEE) in the 802.11 family of specifications and updated by for example the Wi-Fi Alliance (WFA). There are currently intense activities in all corners of the world on how to integrate Wi-Fi with Third Generation Partnership Project (3GPP) networks and how to offer a "carrier Wi-Fi" solution where, in a similar fashion as any 3GPP radio access technology, Wi-Fi is integrated with the 3GPP Evolved Packet Core (EPC) and where access selection and traffic steering between 3GPP Radio Access Technologies (RATs) and Wi-Fi may be controlled through the network. Standardization and certification organizations like 3GPP, WFA, Global System for Mobile communications Association (GSMA) and Wireless Broadband Alliance (WBA) are producing material on carrier-integrated Wi-Fi and network equipment manufacturers are making products where Wi-Fi is integrated on different levels.

The FIDO (Fast IDentity Online) Alliance is a 501(c)6 non-profit organization nominally formed in July 2012 to address the lack of interoperability among strong authentication devices as well as the problems users face with creating and remembering multiple usernames and passwords. The FIDO Alliance plans to change the nature of authentication by developing specifications that define an open, scalable, interoperable set of mechanisms that supplant reliance on passwords to securely authenticate users of online services. This new standard for security devices and browser plugins will allow any website or cloud application to interface with a broad variety of existing and future FIDO-enabled devices that the user has for online security.

The FIDO Alliance has two sets of specifications, Universal Authentication Framework (UAF) and Universal 2nd Factor (U2F).

FIDO provides two user experiences, i.e. passwordless FIDO experience and second factor FIDO experience, to address a wide range of use cases and deployment scenarios. FIDO protocols are based on public key cryptography and are strongly resistant to phishing.

The passwordless FIDO experience is supported by the UAF protocol. In this experience, the user registers his/her device to the online service by selecting a local authentication mechanism such as swiping a finger, looking at the camera, speaking into the microphone, entering a PIN, etc. The UAF protocol allows the service to select which mechanisms are presented to the user. Once registered, the user simply repeats the local authentication action whenever they need to authenticate to the service. The user no longer needs to enter their password when authenticating from that device. UAF also allows experiences that combine multiple authentication mechanisms such as fingerprint plus PIN.

The second factor FIDO experience is supported by the U2F protocol. This experience allows online services to augment the security of their existing password infrastructure by adding a strong second factor to user login. The user logs in with a username and password as before. The service can also prompt the user to present a second factor device at any time it chooses. The strong second factor allows the service to simplify its password (e.g. 4-digit PIN) without compromising security. During registration and authentication, the user presents the second factor by simply pressing a button on a Universal Serial Bus (USB) device or tapping over Near Field Communication (NFC). The user can use their FIDO U2F device across all online services that support the protocol leveraging built-in support in web browsers.

FIG. 1 shows a diagram illustrating FIDO architecture. The diagram depicts entities involved in the UAF protocol. Of these entities, only these three directly create and/or process UAF protocol messages: FIDO Server, running on the relying party's infrastructure; FIDO Client, part of the user agent and running on the FIDO user device; and FIDO Authenticator, integrated into the FIDO user device. The FIDO Server has access to the UAF Authenticator Metadata describing all the authenticators it will interact with.

The core UAF protocol consists of four conceptual conversations between a FIDO Client and FIDO Server:

Registration: UAF allows the relying party to register a FIDO Authenticator with the user's account at the relying party. The relying party can specify a policy for supporting various FIDO Authenticator types. A FIDO Client will only register existing authenticators in accordance with that policy.

Authentication: UAF allows the relying party to prompt the end user to authenticate using a previously registered FIDO Authenticator. This authentication can be invoked any time, at the relying party's discretion.

Transaction Confirmation: In addition to providing a general authentication prompt, UAF offers support for prompting the user to confirm a specific transaction. This prompt includes the ability to communicate additional information to the client for display to the end user, using the client's transaction confirmation display. The goal of this additional authentication operation is to enable relying parties to ensure that the user is confirming a specified set of the transaction details (instead of authenticating a session to the user agent).

Deregistration: The relying party can trigger the deletion of the account-related authentication key material.

SUMMARY

Various embodiments of the present disclosure mainly aim at providing a solution for facilitating a device without a SIM card to access a core network. Other features and advantages of embodiments of the present disclosure will also be understood from the following description of specific embodiments when read in conjunction with the accompanying drawings.

In a first aspect of the present disclosure, there is provided a method performed by a FIDO server for facilitating a terminal device without a SIM card, i.e. non-SIM device, to access a first network, e.g. a 3GPP core network, via a second network, e.g. a Wi-Fi network or any other radio access network. The terminal device without a SIM card is FIDO enabled. The method comprises obtaining association information for the terminal device without a SIM card indicative of an association between the terminal device without a SIM card and a user subscription account, and authentication information for the terminal device without a SIM card. The method also comprises causing the terminal device without a SIM card to be registered with the FIDO server according to a set of FIDO Alliance specifications based at least on the association information and the authentication information, in response to receipt of a request for registration with the FIDO server from the terminal device without a SIM card. The request comprises at least the authentication information for the terminal device without a SIM card. The set of FIDO Alliance specifications for example comprises a set of FIDO Alliance UAF specifications or a set of FIDO Alliance U2F specifications. The method further comprises providing registration information for the terminal device without a SIM card to an Authentication, Authorization, and Accounting, AAA, server, in response to receipt at the AAA server of an authentication request from the terminal device without a SIM card, so as to facilitate the AAA server to authenticate the terminal device without a SIM card to access the first network via the second network based at least on the registration information.

In an embodiment, said causing the terminal device without a SIM card to be registered with the FIDO server may further comprise verifying an identity of the terminal device without a SIM card with the obtained association information and the authentication information so as to trigger the registration with the FIDO server and adding a public key received from the terminal device without a SIM card into the association information. In this embodiment, the registration information may comprise at least the public key of the terminal device without a SIM card and the association information.

In a further embodiment, said causing the terminal device without a SIM card to be registered with the FIDO server may further comprise specifying a local authentication mechanism for the terminal device without a SIM card. The local authentication mechanism may comprise a biometric authentication mechanism.

In another embodiment, the user subscription account may correspond to a terminal device with a SIM card, i.e. a SIM device. The association information may comprise a user identity shared by the SIM device and the terminal device without a SIM card. The association information and the authentication information may be created at an application server.

In a second aspect of the present disclosure, there is provided a method performed by an AAA server for facilitating a terminal device without a SIM card to access a first network, e.g. a 3GPP core network, via a second network, e.g. a Wi-Fi network or any other radio access network. The terminal device without a SIM card is FIDO enabled. The method comprises obtaining registration information from a FIDO server, in response to receipt of an authentication request from the terminal device without a SIM card. The registration information comprises at least association information for the terminal device without a SIM card indicative of an association between the terminal device without a SIM card and a user subscription account. The method also comprises verifying an identity of the terminal device without a SIM card with the registration information so as to trigger authentication of the terminal device without a SIM card by the AAA server and authenticating the terminal device without a SIM card according to an Extensible Authentication Protocol-Transport Layer Security, EAP-TLS protocol extended with FIDO authentication data to access the first network via the second network.

In an embodiment, the FIDO authentication data may be sent to the terminal device without a SIM card. The FIDO authentication data may comprise at least a FIDO challenge, e.g. a UAF challenge or a U2F challenge, and a FIDO authentication policy, e.g. a FIDO Alliance UAF policy and a FIDO Alliance U2F policy for indicating a local authentication mechanism for the terminal device without a SIM card. Particularly, the local authentication mechanism may comprise a biometric authentication mechanism.

In a third aspect of the present disclosure, there is provided a method performed by an Application Server, AS for facilitating a terminal device without a SIM card to register with a FIDO server. The method comprises creating association information of the terminal device without a SIM card with a SIM device, routing information directed to the FIDO server and authentication information for the terminal device without a SIM card to register with the FIDO server. The method also comprises informing the FIDO server of the association information and the authentication information and informing the SIM device of at least the routing information and the authentication information, which is further provided to the terminal device without a SIM card for registration with the FIDO server.

In a fourth aspect of the present disclosure, there is provided a method performed by a terminal device without a SIM card for facilitating the terminal device to access a first network via a second network. The terminal device without a SIM card is FIDO enabled. The method comprises obtaining routing information directed to a FIDO server and authentication information for registration with the FIDO server and requesting registration with the FIDO server via a request message comprising at least the authentication information. The method also comprises registering with the FIDO server according to a set of FIDO Alliance specifications based at least on the authentication information and initiating an authentication procedure with an AAA server to access the first network via the second network.

In an embodiment, the authentication procedure may comprise receiving FIDO authentication data comprising at least a FIDO challenge and a FIDO authentication policy, verifying the FIDO challenge, performing local authentication according to the FIDO authentication policy, computing an authentication result that is signed with a private key created at the terminal device during the registration with the FIDO server, and sending the authentication result to the AAA server without a client certificate and without a public key created at the terminal device during the registration with the FIDO server.

In a fifth aspect of the present disclosure, there is provided an apparatus embodied at or as at least part of a FIDO server for facilitating a terminal device without a SIM card to access a first network via a second network. The terminal device without a SIM card is FIDO enabled. The apparatus comprises an information obtaining unit, a registering unit and an information providing unit. The information obtaining unit is configured to obtain association information for the terminal device without a SIM card indicative of an association between the terminal device without a SIM card and a user subscription account, and authentication information for the terminal device without a SIM card. The registering unit is configured to cause the terminal device without a SIM card to be registered with the FIDO server according to a set of FIDO Alliance specifications based at least on the association information and the authentication information, in response to receipt of a request for registration with the FIDO server from the terminal device without a SIM card. The request comprises at least the authentication information for the terminal device without a SIM card. For example, the set of FIDO Alliance specifications may comprise a set of FIDO Alliance UAF specifications or a set of FIDO Alliance U2F specifications. The information providing unit is configured to provide registration information for the terminal device without a SIM card to an AAA server, in response to receipt at the AAA server of an authentication request from the terminal device without a SIM card, so as to facilitate the AAA server to authenticate the terminal device without a SIM card to access the first network via the second network based on the registration information.

In a sixth aspect of the present disclosure, there is provided an apparatus embodied at or as at least a part of an AAA server for facilitating a terminal device without a SIM card to access a first network, e.g. a 3GPP core network, via a second network, e.g. a Wi-Fi network or any other radio access network. The terminal device without a SIM card is FIDO enabled. The apparatus comprises an information obtaining unit, a verifying unit and an authenticating unit. The information obtaining unit is configured to, in response to receipt of an authentication request from the terminal device without a SIM card, obtain registration information from a FIDO server. The registration information comprises at least association information for the terminal device without a SIM card indicative of an association between the terminal device without a SIM card and a user subscription account. The verifying unit is configured to verify an identity of the terminal device without a SIM card with the obtained registration information so as to trigger authentication of the terminal device without a SIM card by the AAA server. The authenticating unit is configured to authenticate the terminal device without a SIM card according to an EAP-TLS protocol extended with FIDO authentication data to access the first network via the second network.

In a seventh aspect of the present disclosure, there is provided an apparatus embodied at or as at least a part of an application server, AS for facilitating a terminal device without a SIM card to register with a FIDO server. The terminal device without a SIM card is FIDO enabled. The apparatus comprises a creating unit and an informing unit. The creating unit is configured to create association information of the terminal device without a SIM card with a SIM device and to create routing information directed to the FIDO server and authentication information for the terminal device without a SIM card to register with the FIDO server. The informing unit is configured to inform the FIDO server of the association and the authentication information, and to inform the SIM device of the routing information and the authentication information, which is further provided to the terminal device without a SIM card for registration with the FIDO server.

In an eighth aspect of the present disclosure, there is provided an apparatus embodied at or as at least part of a terminal device without a SIM card for facilitating the terminal device without a SIM card to access a first network, e.g. a 3GPP core network, via a second network, e.g. a Wi-Fi network or any other radio access network. The terminal device is FIDO enabled. The apparatus comprises an information obtaining unit, a registration requesting unit, a registration unit and an authentication unit. The information obtaining unit is configured to obtain routing information directed to a FIDO server and authentication information for registration with the FIDO server. The registration requesting unit is configured to request registration with the FIDO server via a request message comprising at least the authentication information. The registration unit is configured to register with the FIDO server according to a set of FIDO Alliance specifications based at least on the authentication information. The authentication unit is configured to initiate an authentication procedure with an AAA server to access the first network via the second network.

In a ninth aspect of the present disclosure, there is provided a FIDO server for facilitating a terminal device without a SIM card to access a first network via a second network. The terminal device without a SIM card is FIDO enabled. The FIDO server comprises a processor and a memory. The memory contains instructions executable by the processor, whereby the FIDO server is operative to perform the method according to the first aspect of the present disclosure.

In a tenth aspect of the present disclosure, there is provided an AAA server for facilitating a terminal device without a SIM card to access a first network via a second network. The terminal device without a SIM card is FIDO enabled. The AAA server comprises a processor and a memory. The memory contains instructions executable by the processor, whereby the AAA server is operative to perform the method according to the second aspect of the present disclosure.

In an eleventh aspect of the present disclosure, there is provided an Application Server, AS for facilitating a terminal device without a SIM card to register with a FIDO server. The AS comprises a processor and a memory. The memory contains instructions executable by the processor, whereby the AS is operative to perform the method according to the third aspect of the present disclosure.

In a twelfth aspect of the present disclosure, there is provide a terminal device without a SIM card and being FIDO enabled. The terminal device comprises a processor and a memory. The memory contains instructions executable by the processor, whereby the terminal device is operative to perform the method according to the fourth aspect of the present disclosure.

It shall be appreciated that various embodiments of the first, second, third and fourth aspect may be equally applied respectively to the fifth, sixth, seventh and eighth aspect of the present disclosure.

Embodiments of the present disclosure afford many advantages, of which a non-exclusive list of examples follows:

An advantage of some embodiments is that they provide a solution enabling end users to log onto an operator's network via Wi-Fi access using FIDO without a need to remember a username/password.

An advantage of some embodiments is that a network operator can generate more revenue by open Wi-Fi access to terminal devices that do not have a SIM card.

An advantage of some embodiments is that biometric authentication enabled by FIDO specifications increases end user experience; and helps a network operator to capture end users' interests, develop a new business opportunity and generate more revenue.

An advantage of some embodiments is that the local authentication mechanism at the terminal device is introduced by FIDO specifications, which increases flexibility for a network operator and end users to customize their own services.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which.

Like reference numbers and designations in the various drawings indicate like elements.

DETAILED DESCRIPTION

Figure 1:
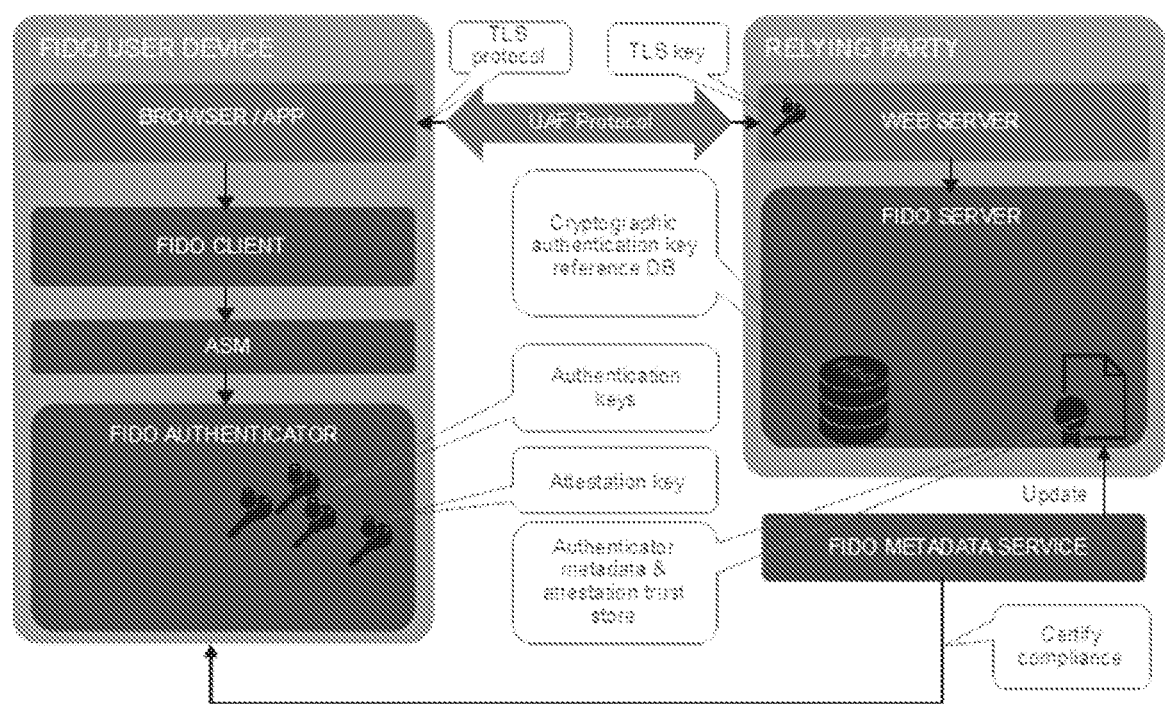
FIG. 1 shows a diagram illustrating FIDO architecture.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "another embodiment," etc. indicate that the embodiment described may include a particular feature, structure, or characteristic, but every embodiment may not necessarily include the particular feature, structure, or characteristic. Further, when a particular feature, structure, or characteristic is described in connection with an embodiment, it is submitted that it is within the knowledge of one skilled in the art to affect such a feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "terminal device" used herein may refer to any terminal or UE having wireless communications capabilities, including but not limited to, mobile phones, cellular phones, smart phones, or personal digital assistants (PDAs), portable computers, laptop, tablet and the like. In this document, a terminal device with a SIM card will be referred to as a SIM device, e.g. a smart phone, while a terminal device without a SIM card will be referred to as a non-SIM device, e.g. a tablet or a laptop.

Some existing solutions for network integrated Wi-Fi offer a way to seamlessly access Wi-Fi and EPC, and to authenticate Wi-Fi use through SIM based authentication methods (e.g. EAP-SIM, EAP-Authentication and Key Agreement (EAP-AKA) or EAP-AKA') towards the same network entities as are used for 3GPP. EAP is an authentication framework which supports multiple authentication methods. EAP is also applicable in scenarios where IP layer connectivity is not available. EAP-AKA' is a variant of EAP-AKA.

Recently, some solutions have been proposed for a non-SIM device to access a 3GPP network via Wi-Fi access and to authenticate an identity of the non-SIM device through certificate based authentication (as disclosed in PCT Application No. PCT/CN2015/076667), or through username/password based authentication.

In the existing solution for a non-SIM device to access the 3GPP EPC network via an untrusted Wi-Fi network, the network authentication is based on the device certificate, which is issued by an operator's proprietary CA server at the time when the device enrolls into the EPC network. This causes a potential performance bottleneck in the network when a large number of terminal devices are registering with the network and also when they attach to the EPC network, the AAA server validating a Certificate Revocation List (CRL) against the CA server via OCSP.

In the existing solution for a non-SIM device to access the 3GPP EPC network via a trusted Wi-Fi network, it is based on an open Service Set Identifier (SSID) solution to provide a web-portal based "username/password" login interface for an end user. Since the username and password have to be correctly remembered, the user experience may be reduced. Furthermore, for a security reason, the password is also time limited. It is gradually regarded as a hindrance to boost the operator's Wi-Fi business.

In order to address at least part of the above disadvantages, various embodiments of the present disclosure propose an efficient solution to facilitate a non-SIM device to access a core network based on FIDO as described in the Background Section.

Figure 2:
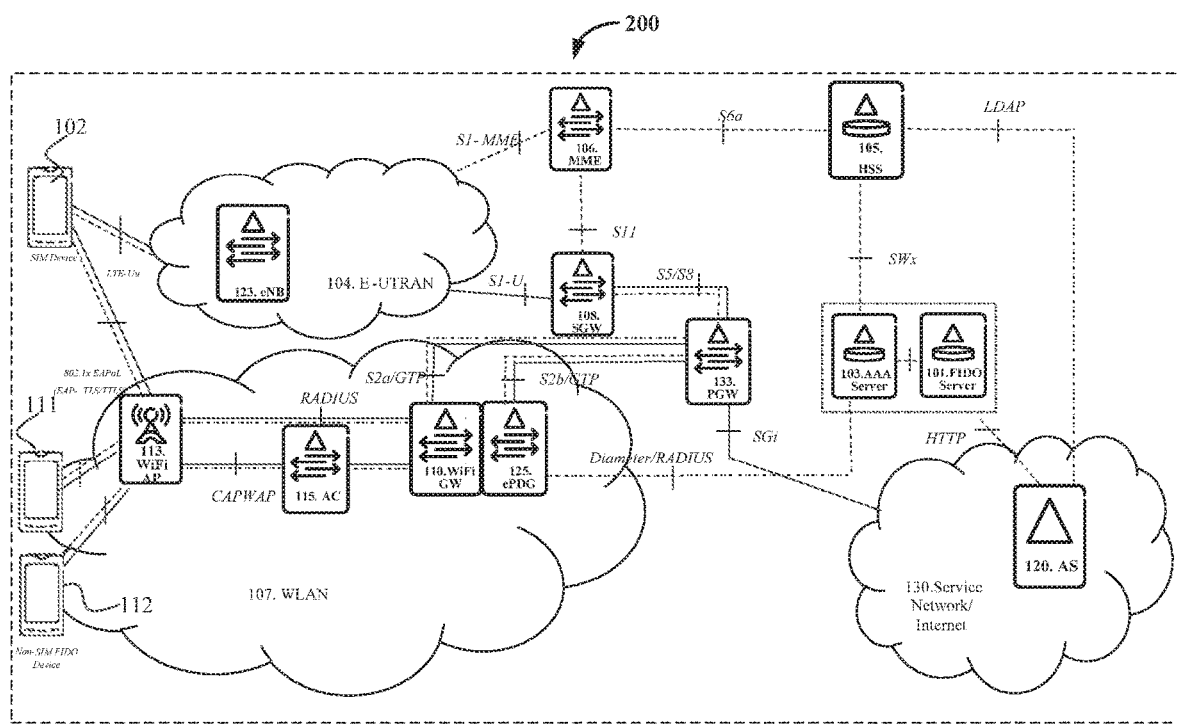
FIG. 2 illustrates an embodiment of a communications system in which embodiments of the present disclosure may be implemented.

FIG. 2 illustrates an embodiment of a communications system 200 in which embodiments of the present disclosure may be implemented. The solid lines between the nodes in FIG. 2 illustrate the data plane, while the dotted lines between the nodes in FIG. 2 illustrate the control plane.

In FIG. 2, a SIM device 102 may be served by a Radio Access Network (RAN) node such as an eNB 123 in an Evolved Universal Terrestrial Radio Access Network (E-UTRAN) 104. It would be understood that there may be more than one eNB 123 that communicates with the SIM device 102. The SIM device 102 may be connected to the E-UTRAN 104 via an LTE-Uu interface.

The communications system 200 also comprises a Wi-Fi network represented by WLAN 107 in FIG. 2. The WLAN 107 comprises a wireless Access Point (AP) represented by Wi-Fi AP 113, an Access Controller (AC) represented by AC 115, a wireless gateway (GW) represented by Wi-Fi GW 110 and an evolved Packet Data Gateway (ePDG) 125. Particularly, the AC 115 may handle access control, usage monitoring and policy enforcement in the Wi-Fi network 107.

The ePDG 125 may be connected to a Packet Gateway which is exemplified with PGW 133 in FIG. 2. The ePDG 125 may be connected to the PGW 133 for example using an S2b GTP interface, where GTP is short for GPRS Tunneling Protocol. The Wi-Fi GW 110 may also be connected to the PGW 133 for example using an S2a GTP interface. The PGW 133 may be seen as a gateway to a service network 130 which may be e.g. the Internet. The interface between the PGW 133 and the service network 130 may be an SGi interface.

Non-SIM devices 111 and 112 may be connected to the Wi-Fi AP 113 using e.g. 802.1x EAPoL (EAP-TLS/TTLS). EAPoL is short for Extensible Authentication Protocol. TLS is short for Transport Layer Security and TTLS is short for Tunneled Transport Layer Security. The TLS protocol provides communications security over the Internet. The protocol allows client/server applications to communicate in a way that is designed to prevent eavesdropping, tampering, or message forgery. The Wi-Fi AP 113 may be connected to the AC 115 via a Control And Provisioning of Wireless Access Points protocol (CAPWAP) interface. The Wi-Fi GW 110 may be connected to the Wi-Fi AP 113 for example using an interface based on a RADIUS protocol. RADIUS is short for Remote Authentication Dial-In User Service.

The PGW 133 may be connected to a Serving GateWay (SGW) 108 for example via an S5/S8 interface. The SGW 108 may be connected to the RAN network 104 using e.g. an S1-U interface.

The communications system 200 further comprises a Mobility Management Entity (MME) 106. The MME 106 may be connected to the RAN network 104 using e.g. an S1-MME interface. The MME 106 may be connected to a subscriber database exemplified with a Home Subscriber Server (HSS) 105 in FIG. 2. The connection between the MME 106 and the HSS 105 may be referred to as an S6a interface.

The HSS 105 may be connected to an AAA server 103 for example via a SWx interface. The AAA server 133 may be connected to the ePDG 125 via e.g. a Diameter or RADIUS interface.

In FIG. 2, there is also shown a FIDO server 101 beside the AAA server 103. It shall be understood that the FIDO server 101 and the AAA server 103 may be embodied as a single entity or as two separate entities connected to each other via a secured link. In order to clearly depict respective functions of these two servers, they are illustrated as two separate entities in a same block in FIG. 2.

The AAA server 103 and/or the FIDO server 101 may be connected to an Application Server (AS) 120 for example via a Hyper Text Transport Protocol (HTTP) interface. The AS 120 may be connected to the HSS 105 for example via a Lightweight Directory Access Protocol (LDAP) interface.

The SGW 108, the PGW 133, the MME 106, the HSS 105, the AAA server 103, the FIDO server 101 and possibly also the AS 120 may be seen as being comprised in a core network of the communications system as shown in FIG. 2. Alternatively, the AS 120 may be seen as being comprised in the core network or as being comprised in the service network 130.

It should be appreciated that the links between the nodes in the communications system of FIG. 2 may be of any suitable kind including either a wired or wireless link. The links may use any suitable protocol depending on type and level of layer (e.g. as indicated by the Open Systems Interconnection (OSI) model) as understood by a person skilled in the art.

A solution for facilitating a non-SIM device to access a core network via Wi-Fi access according to some embodiments of the present disclosure will now be described with reference to an example signaling flow depicted in FIGS. 3A, 3B and 4. The following description will be based on the embodiment of the communications system 200 as illustrated in FIG. 2, but any other suitable embodiment of the communications system 200 is also applicable.

Figure 3A:
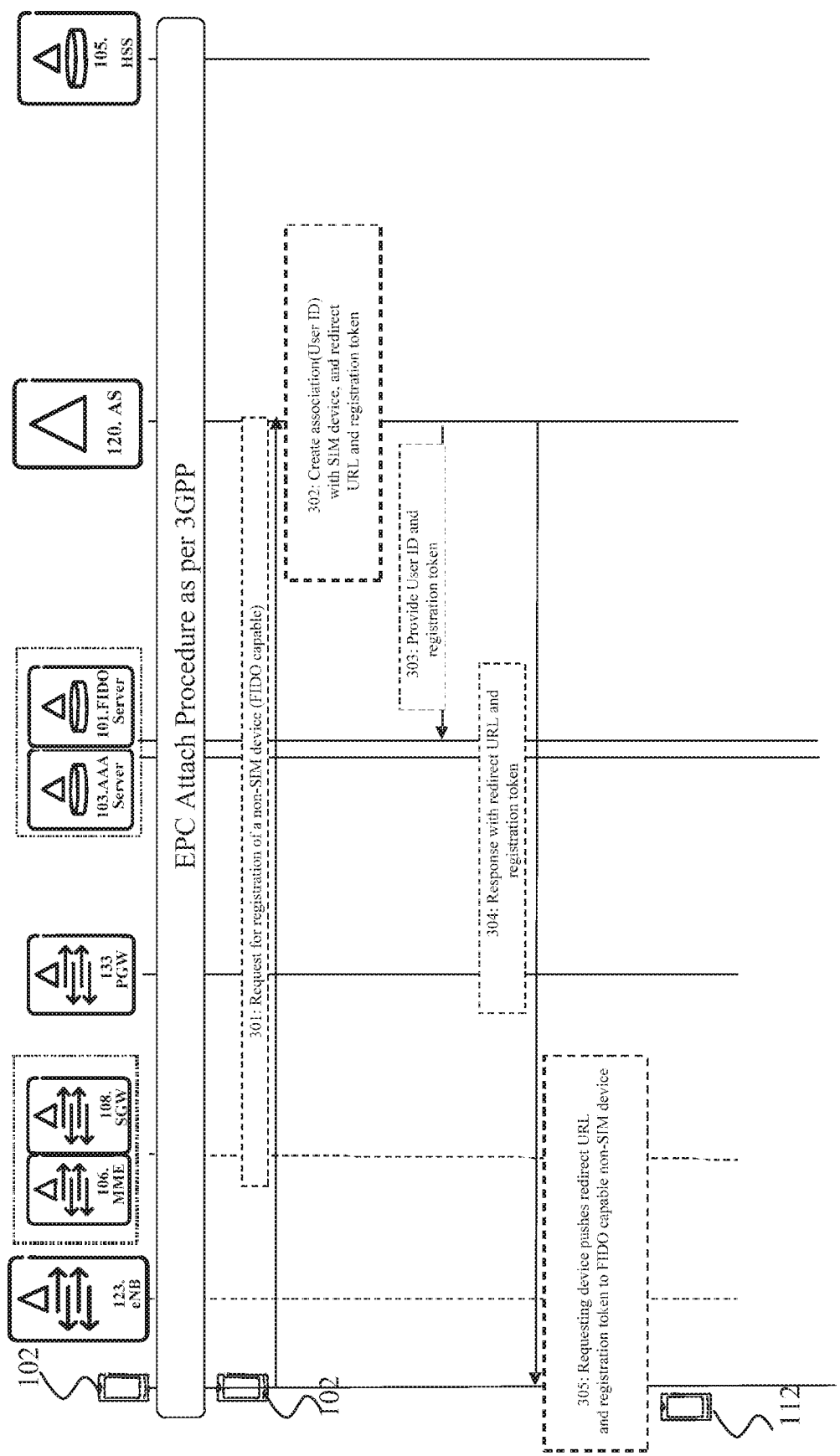
FIG. 3A and FIG. 3B illustrate a signalling flow diagram for a non-SIM device to register with a FIDO server according to an embodiment of the present disclosure.
Figure 3B:
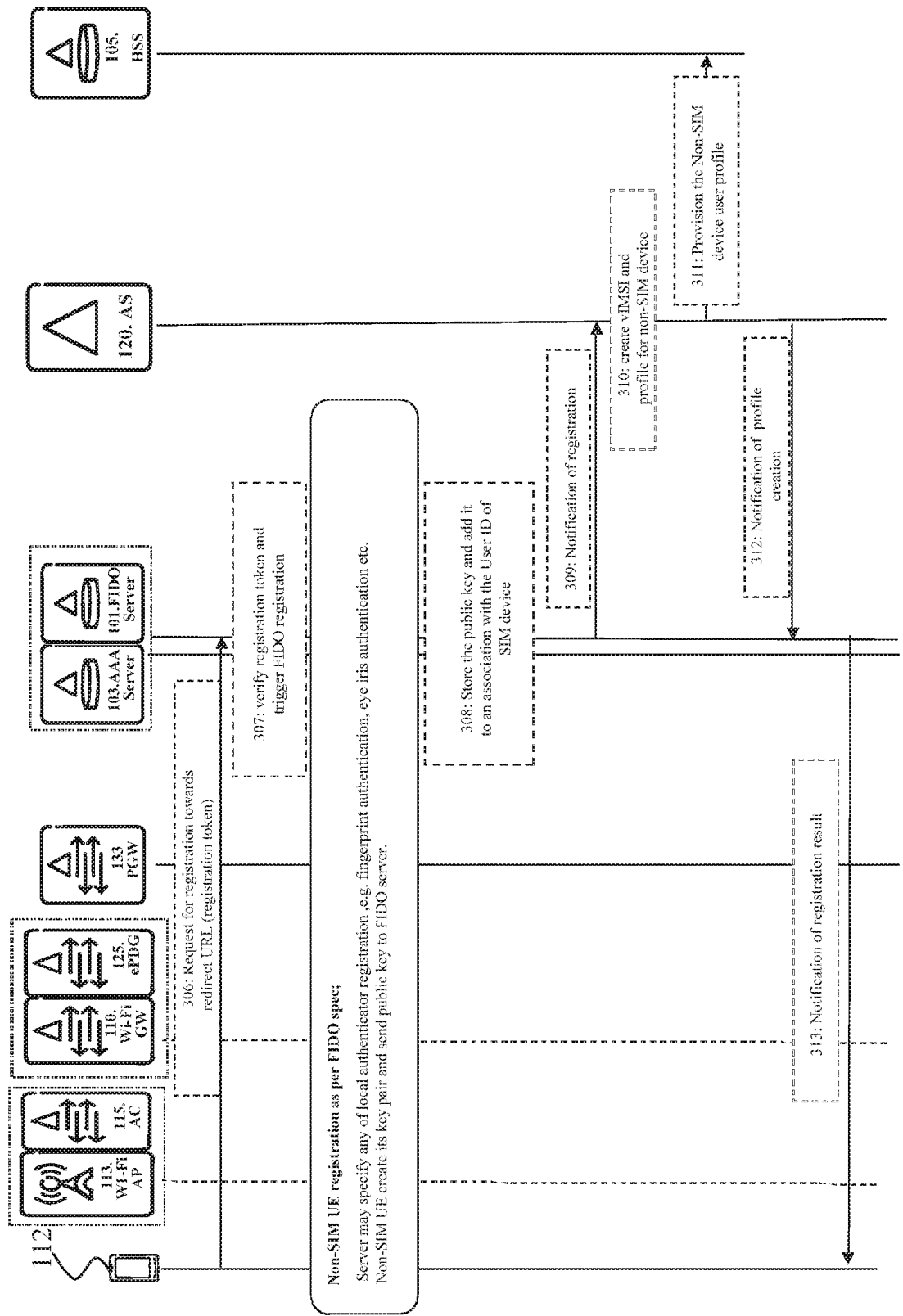

FIG. 3A and FIG. 3B illustrate a signalling flow diagram for a non-SIM device, e.g. the non-SIM device 112 of FIG. 2 to register with a FIDO server, e.g. the FIDO server 101 according to an embodiment of the present disclosure, wherein FIG. 3A illustrates a first part of the registration for obtaining registration related information and FIG. 3B illustrates a second part of the registration for registration with the FIDO server using the received registration related information. Please note that the non-SIM device is FIDO enabled. A "FIDO enabled" device used herein means that the device can operate according to the FIDO specifications.

The flow starts from FIG. 3A. It is assumed that a SIM device, e.g. the SIM device 102 of FIG. 2 has attached to a 3GPP EPC network as per 3GPP protocol.

Step 301

The SIM device 102 logs on an application server, e.g. the AS 120 of FIG. 2, and initiates a request for registration of the non-SIM device 112 with the network. Meanwhile, the SIM device 102 may indicate to the AS 120 that the non-SIM device 112 is FIDO enabled.

Step 302

Upon receipt of the request from the SIM device 102, the AS 120 authenticates the SIM device and creates FIDO registration context data for the non-SIM device 112. For example, the AS 120 creates association information indicative of an association between the SIM device 102 and the non-SIM device 112, e.g. a User Identity (ID) shared by the SIM and non-SIM devices. Additionally, the AS 120 creates routing information directed to the FIDO server 101 and authentication information for the non-SIM device 112. The FIDO registration context data may comprise the association information, the routing information and the authentication information. As an example, the routing information may be a redirect Uniform Recourse Locator (URL) directed to the FIDO server, while the authentication information may be a registration token. That information will be used for later FIDO registration of the non-SIM device 112.

Step 303

The AS 120 forwards at least part of the FIDO registration context data including the association information, e.g. User ID and the authentication information, e.g. registration token, to the FIDO server 101.

Step 304

The AS 120 sends at least part of the FIDO registration context data including the association information, e.g. User ID, the authentication information, e.g. registration token, and the routing information, e.g. redirect URL, to the SIM device 102 as a response to its registration request.

Seen from the perspective of the SIM-device 102, it receives the FIDO registration context data from the AS 120.

Step 305

The SIM-device 102 pushes the received FIDO registration context data to the non-SIM device 112 via a secured manner, e.g. a proprietary cloud service, or bar scanning etc.

The above procedure consisting of steps 301-305 illustrates a specific method to obtain the information required for registration of a non-SIM device with a FIDO server by associating the non-SIM device with a SIM device. However, it is not limited to associate the non-SIM device to a SIM device. The non-SIM device may be more generally associated with a user subscription account already registered in the network. In such a case, the user subscription account may be associated e.g. with a SIM device or a landline device that is chargeable and/or trackable. As an example, the association between a non-SIM device with a user subscription account and authentication information for the non-SIM device may be created by a network operator, e.g. manually created by a staff of the operator.

Now the signalling flow proceeds to FIG. 3B.

Step 306

The non-SIM device 112 may send a registration request towards the FIDO server 101 according to the received routing information, e.g. on the redirect URL. The registration request may include the authentication information, e.g. the registration token, received from the AS 120.

Step 307

The FIDO server 101 verifies the authentication information received from the non-SIM service 112 and then triggers a FIDO registration procedure according to a set of FIDO Alliance specifications. The set of FIDO Alliance specifications may comprise a set of FIDO Alliance UAF specifications or a set of FIDO Alliance U2F specifications.

During the FIDO registration procedure, the FIDO server 101 may specify a local authentication mechanism for the non-SIM device 112 by indicating a FIDO policy, e.g. a UAF or U2F policy to the non-SIM device 112. The local authentication mechanism may include, but not limited to, a biometric authentication mechanism, e.g. fingerprint authentication, face authentication, eye iris authentication, voice recognition and the like, or an authentication mechanism via a second-factor device or via a secure PIN and the like, or any combination thereof.

The non-SIM device 112 may check the local authentication mechanism specified by the FIDO policy and acts accordingly, for example, marking a fingerprint of the user, scanning eye iris of the user etc. Once these actions, like biometric recording, are done, the non-SIM device 112 may create its secret key pair including a private key and a public key, and then send the public key to the FIDO server 101.

Step 308

The FIDO server 101 may store the public key received from the non-SIM device 112 and add it into the association information of the non-SIM device 112 with the SIM device 102, e.g. associating the public key with the User ID shared by the non-SIM device 112 and the SIM device 102.

Step 309

The FIDO server 101 may notify the AS 120 regarding the registration of the non-SIM device 112 with the FIDO server 101.

Step 310

Upon receipt of the notification from the FIDO server 101, the AS 120 may check the context information of previous registration from the SIM device 102 and then creates a user profile for the non-SIM device 112, e.g. virtual International Mobile Subscriber Identification Number (vI-MSI).

Step 311

The AS 120 may provision the created user profile for the non-SIM device 112 to the HSS 105.

Step 312

The AS 120 may notify the FIDO server 101 regarding the result of user profile creating.

Step 313

The FIDO server 101 may notify the non-SIM device 112 of the FIDO registration result as a response to its registration request.

Please note that the above steps 309-313 may be implemented following a registration procedure based on the existing FIDO specifications, which thus will not be detailed herein. Although the above steps are described in a certain order as shown, it shall be appreciated that some steps could be performed in an order different from the one as described. For example, steps 303 and 304 may be performed in parallel or in a reverse order.

Till now, the non-SIM device 112 has registered with the FIDO server 101 via the Wi-Fi network 107. In the following, the non-SIM device 112 can request for access to the core network via the Wi-Fi network 107.

Figure 4:
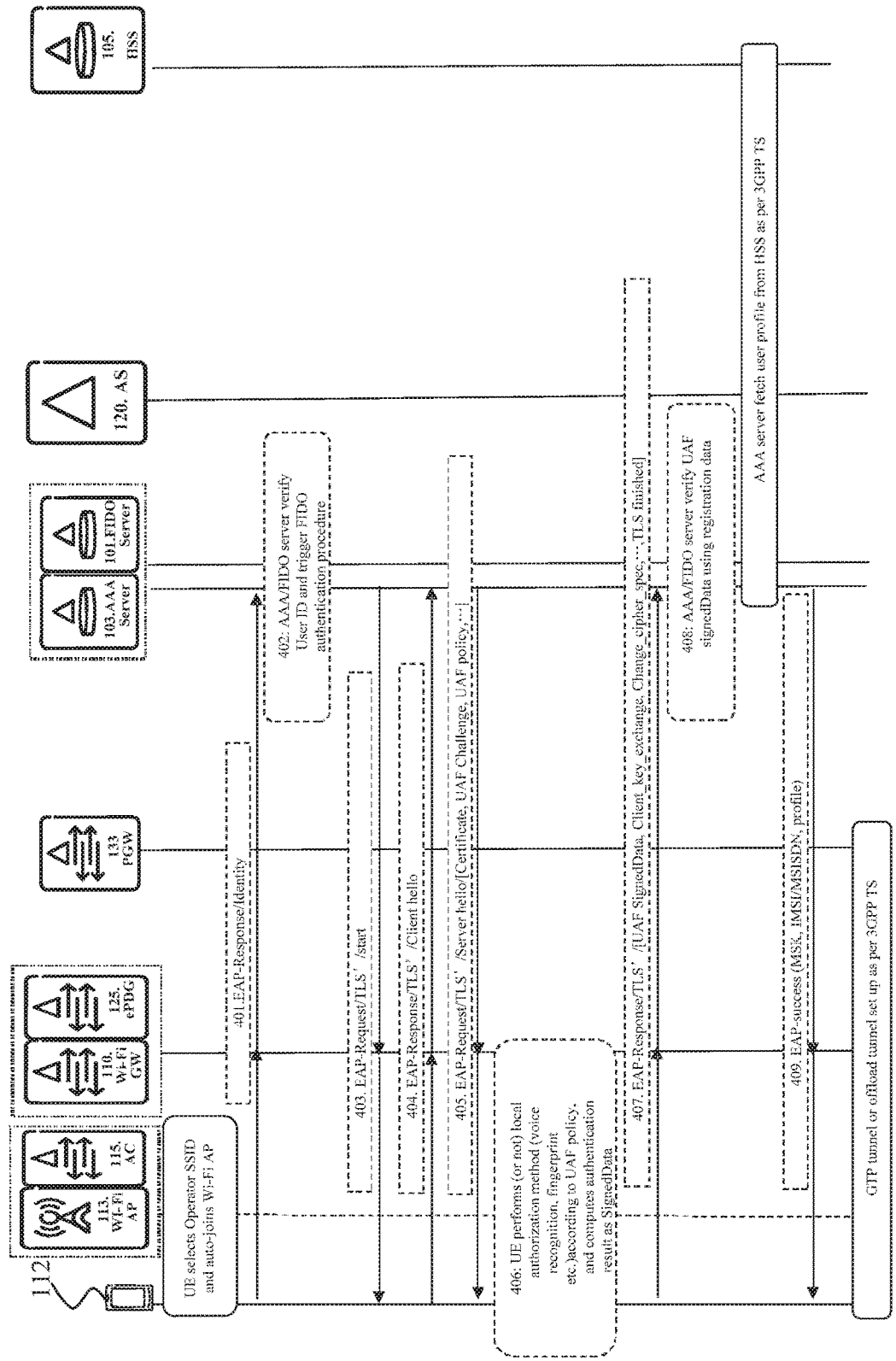
FIG. 4 illustrates a signalling flow diagram for a non-SIM device to request authentication from an AAA server to access the core network according to an embodiment of the present disclosure.

FIG. 4 illustrates a signalling flow diagram for a non-SIM device, e.g. the non-SIM device 112 of FIG. 2 to request authentication from an AAA server, e.g. the AAA server 103 of FIG. 2, to access the core network according to an embodiment of the present disclosure.

It is assumed that the non-SIM device 112 has selected an Operator SSID and auto-joined the Wi-Fi AP 113 and that the non-SIM device 112 is attaching into a 3GPP EPC network via trusted non-3GPP access, e.g. operator Wi-Fi access.

The non-SIM device 112 may transmit a request message to the AAA server 103. The request message may be request for authentication to access the core network through the Wi-Fi network 107. For example, a Diameter-EAP-Request message may serve as the authentication request. Then the following procedure is triggered.

Step 401

The non-SIM device 112 may transmit an EAP-Response message to the AAA server 103, indicated as EAP-Response/Identity in FIG. 4. The EAP-Response may be transmitted via at least one of the Wi-Fi AP 113, the AC 115, the Wi-Fi GW 110 and the ePDG 125 before it reaches the AAA server 103. The EAP-Response message may comprise an identity associated with the non-SIM device 112, e.g. the User ID.

Step 402

The AAA server 103 obtains registration related information of the non-SIM device 112 from the FIDO server 101. For example, the registration related information may comprise at least association information, e.g. the User ID, for the non-SIM device 112 indicative of an association of the non-SIM device 112 with the SIM device 102. Then, the AAA server 103 may verify an identity of the non-SIM device 112 with the obtained association information, for example by checking whether the User ID provided by the non-SIM device 112 is identical to the User ID obtained from the FIDO server 101. Once the non-SIM device 112 is verified, a FIDO authentication procedure is triggered.

Step 403

The AAA server 103 may transmit an EAP-Request message to the non-SIM device 112, indicated as EAP-Request/TLS'/Start in FIG. 4. TLS' used herein refers to an EAP-TLS authentication procedure extended with FIDO authentication data. "Start" refers to the TLA conversation with the authenticator, i.e. the AAA server 103. The EAP-Request may be transmitted via at least one of the Wi-Fi AP 113, the AC 115, the Wi-Fi GW 110 and the ePDG 125 before it reaches the non-SIM device 112.

Step 404

The non-SIM device 112 may transmit an EAP-Response message to the AAA server 103, indicated as EAP-Response/TLS'/Client_hello in FIG. 4. TLS'/Client_hello is a handshake message transmitted between an end device and the authenticator, i.e. the AAA server 103. The EAP-Response message may be transmitted via at least one of the Wi-Fi AP 113, the AC 115, the Wi-Fi GW 110 and the ePDG 125 before it reaches the AAA server 103. The EAP-Response message in step 404 may be a response to the request sent in step 403.

Step 405

The AAA server 103 may transmit an EAP-Request message to the non-SIM device 112, indicated as EAP-Request/TLS'/Server hello/(Certificate, UAF Challenge, UAF policy, . . . ) in FIG. 4. The TLS'/Server hello is a handshake message. The content contained in the parenthesis refers to possible information included in the EAP-Request message. The EAP-Request message may be transmitted via at least one of the Wi-Fi AP 113, the AC 115, the Wi-Fi GW 110 and the ePDG 125 before it reaches the non-SIM device 112. The EAP-Request message may comprise at least the FIDO authentication data. The FIDO authentication data may include a FIDO challenge, e.g. a UAF challenge or a U2F challenge, and a FIDO authentication policy, a UAF policy or a U2F policy. The FIDO authentication policy may specify a local authentication mechanism for the non-SIM device 112. The EAP-Request message may also comprise a server certificate.

Step 406

The non-SIM device 112 may authenticate the server based on the data received in the EAP-Request message as normal EAP TLS procedure.

In addition, the non-SIM device 112 verifies the received FIDO challenge, selects a local authentication mechanism according to the received FIDO authentication policy and then performs the specified local authentication mechanism and computes an authentication result, e.g. FIDO 'SignedData', signed with a private key created at the non-SIM device 112 during the registration with the FIDO server 101.

The local authentication mechanism may include, but not limited to, a biometric authentication mechanism, e.g. fingerprint authentication, face authentication, eye iris authentication, voice recognition and the like, or an authentication mechanism via a second-factor device or via a secure PIN and the like, or any combination thereof.

Step 407

The non-SIM device 112 may transmit an EAP-Response message to the AAA server 103, indicated as EAP-Response/TLS'/(UAF_SignedData, Client_key_exchange, Change_cipher_spec, . . . , TLS finished) in FIG. 4 to send the authentication result to the AAA server 103. The content contained in the parentheses refers to possible information included in the EAP-Response message. For example, this possible information may comprise the authentication result, i.e. SignedData, a pre-master key included in Client_key_exchange, indication of a cipher specification by Change_cipher_spec and so on, but without a client certificate and public key, since the public key has already been registered at the server side during the registration procedure. The "TLS finished" indicates that the handshake is finished. The EAP-Response message may be transmitted via at least one of the Wi-Fi AP 113, the AC 115, the Wi-Fi GW 110 and the ePDG 125 before it reaches the AAA server 103. The EAP-Response message may be seen as a response to the request sent in step 404.

Step 408

The AAA server 103 may verify the TLS data received from the non-SIM device 112 and calculate a Master Session Key (MSK) as normal EAP/TLS procedure. In addition, the AAA server 103 may verify the 'SignedData' received from the non-SIM device 112 using the public key previously registered by the non-SIM device 112. Optionally, the AAA server 103 may fetch the user profile data from HSS 105 as per 3GPP specifications.

Step 409

The AAA server 103 accomplishes authentication of the non-SIM device 112 and then sends security data, user profile etc. to the non-SIM device 112.

Subsequently, a GPRS Tunneling Protocol (GTP) tunnel or an offload tunnel is set up as per 3GPP specifications.

In the above example, it is assumed that the non-SIM device is attaching into a 3GPP EPC network via trusted non-3GPP access, e.g. operator Wi-Fi access. It is also feasible that the non-SIM device is attaching into the core network via untrusted non-3GPP access, e.g. public Wi-Fi access. In this case, the non-SIM device may set up an IPsec tunnel with ePDG which then triggers the authentication procedure towards the AAA server as outlined in the above example.

Till now, the non-SIM device has been authenticated for access to the core network.

In the following, several methods performed by respective network elements, such as a FIDO server, an AAA server, an Application Server and a non-SIM device as shown in FIG. 2, for facilitating the non-SIM device to access a first network, e.g. a 3GPP core network, via a second network, e.g. a Wi-Fi network, will be described with reference to FIGS. 5-8.

Figure 5A:
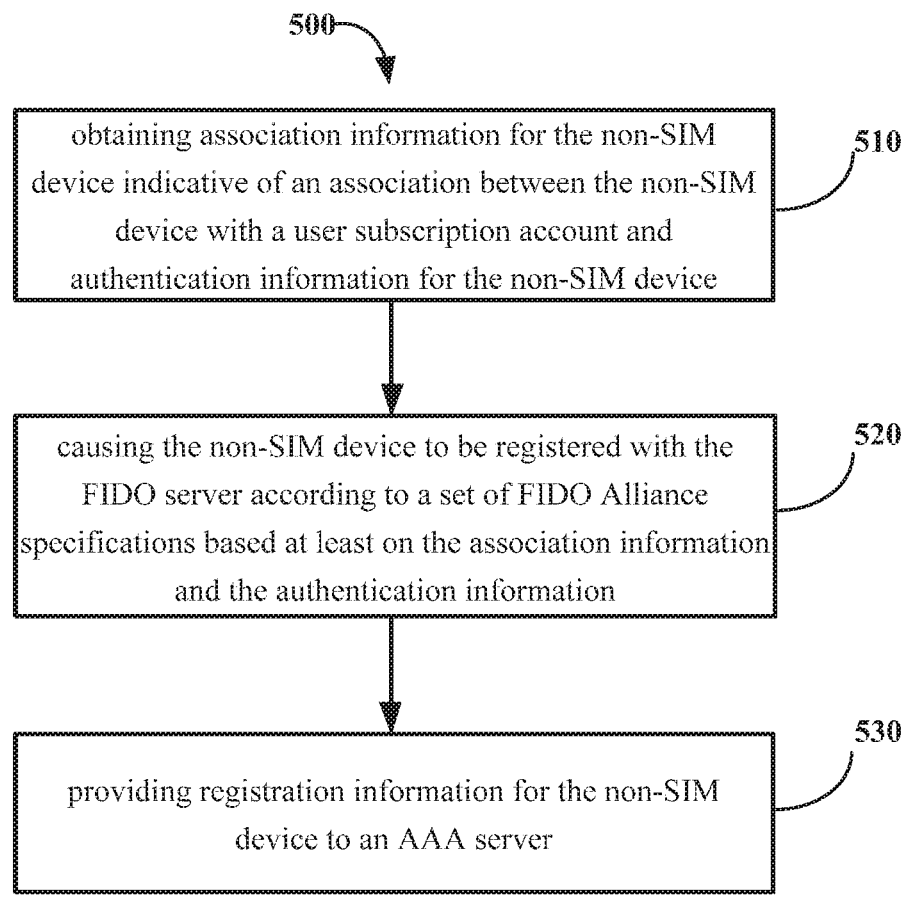
FIG. 5A illustrates a flowchart of a method performed by a FIDO server according to some embodiments of the present disclosure.

FIG. 5A illustrates a flowchart of a method 500 performed by a FIDO server, e.g. FIDO server 101 of FIG. 2, for facilitating a terminal device without a SIM card, e.g. non-SIM device 112 of FIG. 2, to access a first network, e.g. a 3GPP core network, via a second network, e.g. a Wi-Fi network 107 of FIG. 2, according to some embodiments of the present disclosure. The terminal device without a SIM card is FIDO enabled. Hereafter, the term "terminal device without a SIM card" will be used to more generally represent the non-SIM device as discussed above; the term "first network" will be used to more generally represent the 3GPP core network as discussed above; the term "second network" will be used to more generally represent the Wi-Fi network as discussed above or any other radio access network, including 3GPP or non-3GPP access network.

As illustrated, the method 500 enters at block 510, in which the FIDO server obtains association information for the terminal device without a SIM card indicative of an association between the terminal device without a SIM card and a user subscription account, and authentication information for the terminal device without a SIM card.

In an embodiment, the FIDO server may obtain the association information and the authentication information from an application server through the procedure as described with reference to FIG. 3A. Particularly, the user subscription account may correspond to a terminal device with a SIM card, i.e. a SIM device. The association information may comprise a user identity shared by the SIM device and the terminal device without a SIM card. The association information and the authentication information may be created at the application server.

In another embodiment, the FIDO server may obtain the association and authentication information from other network elements, like an Operations Support System (OSS) via other association manners, for example manual association.

At block 520, in response to receipt of a request for registration with the FIDO server from the terminal device without a SIM card, the FIDO server causes the terminal device without a SIM card to be registered with the FIDO server according to a set of FIDO Alliance specifications based at least on the obtained association information and authentication information. The request comprises at least the authentication information for the terminal device without a SIM card. As an example, the set of FIDO Alliance specifications may comprise a set of FIDO UAF specifications or a set of FIDO U2F specifications.

At block 530, in response to receipt at the AAA server of an authentication request from the terminal device without a SIM card, the FIDO server provides registration information for the terminal device without a SIM card to an AAA server so as to facilitate the AAA server to authenticate the terminal device without a SIM card to access the first network via the second network based at least on the registration information.

Figure 5B:
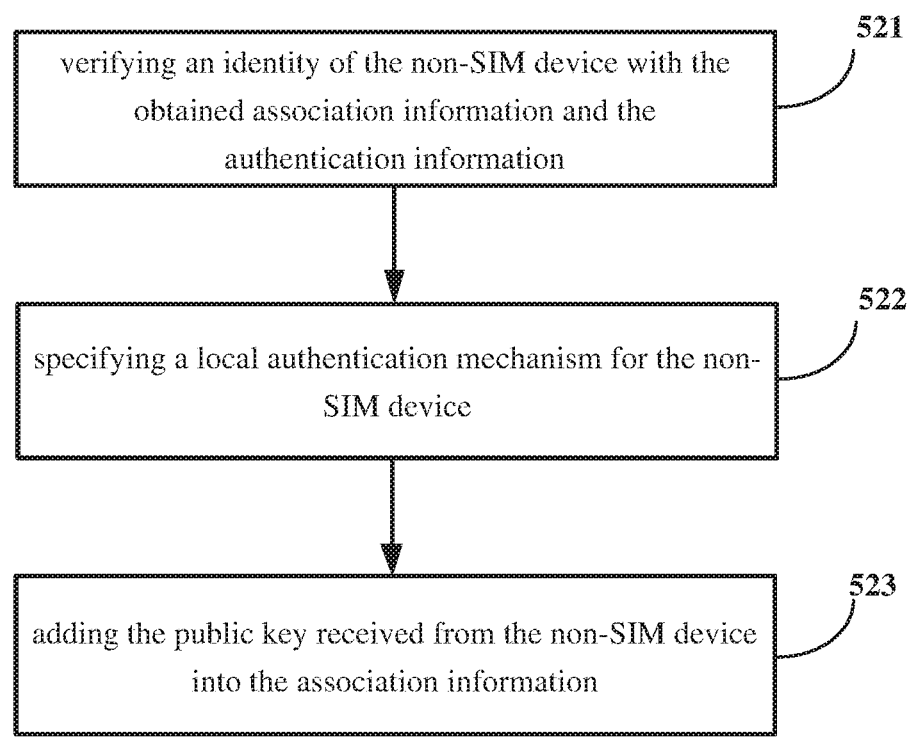
FIG. 5B illustrates detailed operations of block 520 of FIG. 5A according an embodiment of the present disclosure.

FIG. 5B illustrates detailed operations in block 520 of FIG. 5A according to an embodiment of the present disclosure.

As illustrated, in order to register the terminal device without a SIM card with the FIDO server, the FIDO server may verify, at block 521, an identity of the terminal device without a SIM card with the obtained association information and authentication information so as to trigger the registration of the terminal device with the FIDO server.

Optionally, at block 522, the FIDO server may specify a local authentication mechanism for the terminal device without a SIM card. As mentioned above, the local authentication mechanism may include, but not limited to, a biometric authentication mechanism, e.g. fingerprint authentication, face authentication, eye iris authentication, voice recognition and the like, or an authentication mechanism via a second-factor device or via a secure PIN and the like, or any combination thereof.

At block 523, the FIDO server may add a public key received from the terminal device without a SIM card into the association information.

In this embodiment, the registration information provided to the AAA server may comprise at least the public key of the terminal device without a SIM card and the association information.

Figure 6:
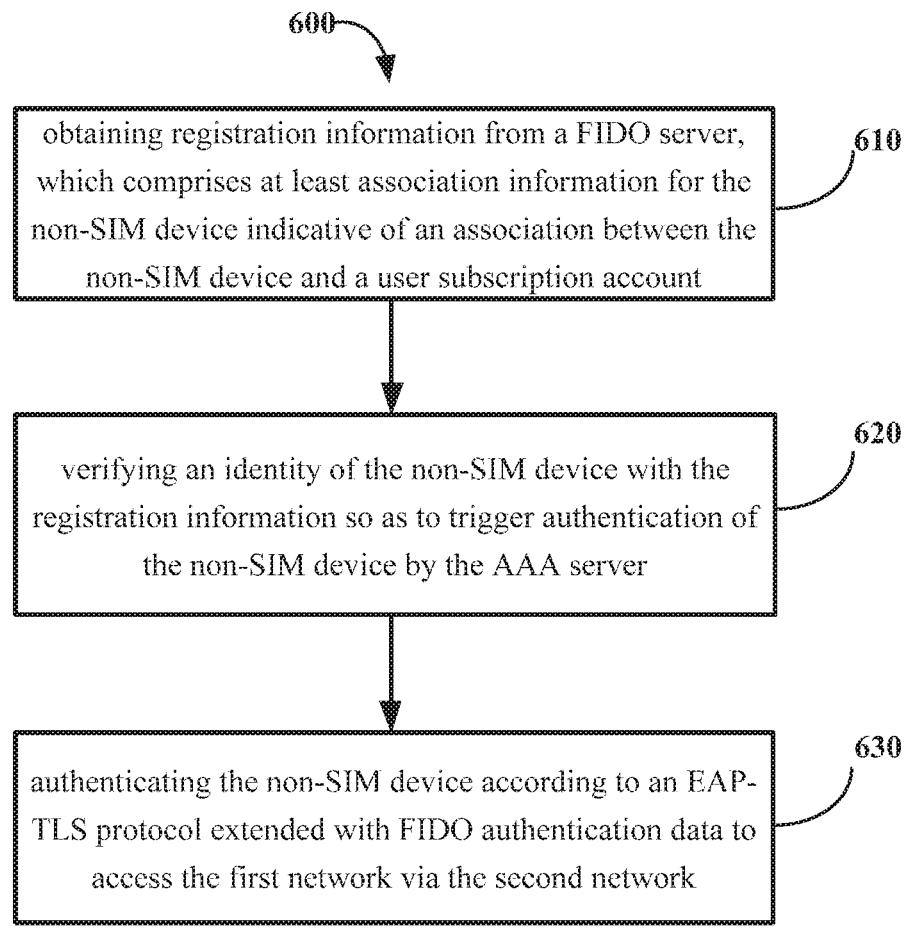
FIG. 6 illustrates a flowchart of a method performed by an AAA server according to some embodiments of the present disclosure.

FIG. 6 illustrates a flowchart of a method 600 performed at an AAA server, e.g. the AAA server 103 of FIG. 2, for facilitating a terminal device without a SIM card, e.g. the non-SIM device 112 of FIG. 2, to access a first network, e.g. a 3GPP core network, via a second network, e.g. a Wi-Fi network 107 of FIG. 2, according to some embodiments of the present disclosure. Also, the terminal device without a SIM card is FIDO enabled. It shall be appreciated that the second network is not limited to Wi-Fi network and may also include any other radio access network.

As illustrated, the method 600 enters at block 610, in which the AAA server obtains registration information from a FIDO server, in response to receipt of an authentication request from the terminal device without a SIM card. The registration information comprises at least association information for the terminal device without a SIM card indicative of an association between the terminal device without a SIM card and a user subscription account.

In an embodiment, the user subscription account may correspond to a terminal device with a SIM card, i.e. a SIM device. The association information may comprise a user identity shared by the SIM device and the terminal device without a SIM card. The association information and the authentication information may be created at an application server.

At block 620, the AAA server verifies an identity of the terminal device without a SIM card with the registration information so as to trigger authentication of the terminal device without a SIM card.

At block 630, the AAA server authenticates the terminal device without a SIM card according to an EAP-TLS protocol extended with FIDO authentication data to access the first network via the second network. Particularly, the AAA server may send the FIDO authentication data to the terminal device without a SIM card. The FIDO authentication data may comprise at least a FIDO challenge and a FIDO authentication policy. As an example, the FIDO authentication policy comprises a FIDO Alliance UAF policy or a FIDO Alliance U2F policy for indicating a local authentication mechanism for the terminal device without a SIM card. Likewise, the FIDO challenge may comprise a UAF challenge or a U2F challenge.

As mentioned above, the local authentication mechanism may include, but not limited to, a biometric authentication mechanism, e.g. fingerprint authentication, face authentication, eye iris authentication, voice recognition and the like, or an authentication mechanism via a second-factor device or via a secure PIN and the like, or any combination thereof.

Figure 7:
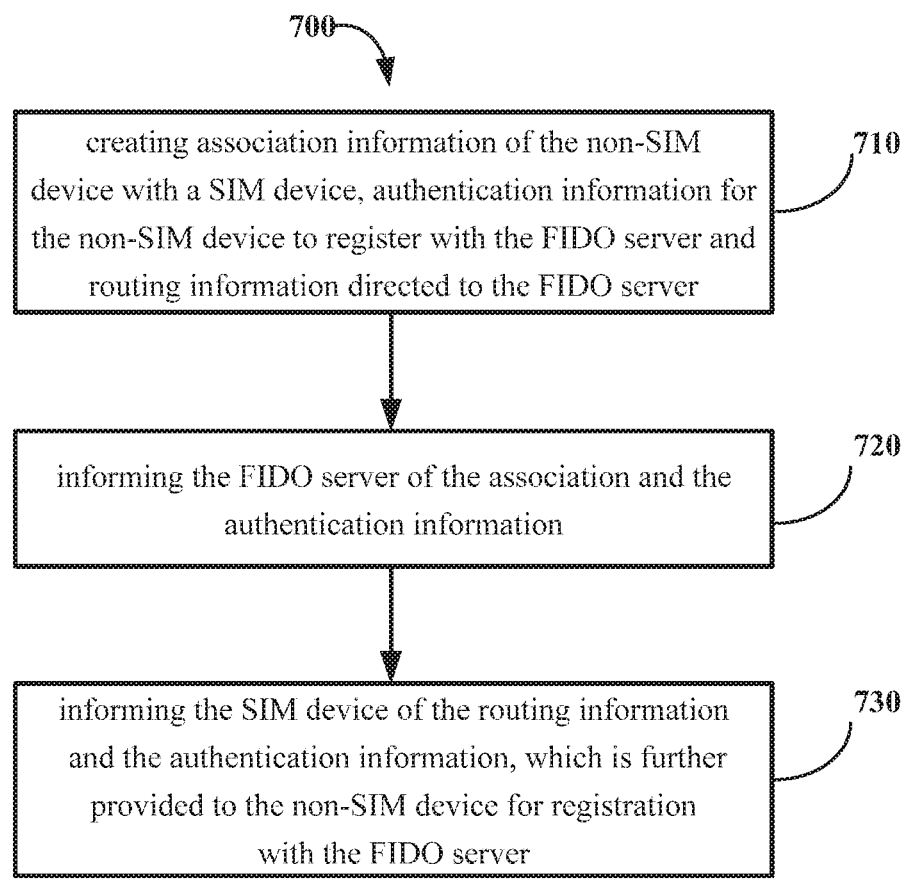
FIG. 7 illustrates a flowchart of a method performed by an Application Server according to some embodiments of the present disclosure.

FIG. 7 illustrates a flowchart of a method 700 performed by an Application Server, e.g. the AS 120 of FIG. 2, for facilitating a terminal device without a SIM card, e.g. the non-SIM device 112, to register with a FIDO server, e.g. FIDO server 101 of FIG. 2, according to some embodiments of the present disclosure.

As illustrated, at block 710, the AS creates association information of the terminal device without a SIM card with a SIM device. The association information may indicate an association between the terminal device without a SIM card and the SIM device. The AS also creates authentication information for the terminal device without a SIM card to register with the FIDO server, e.g. a registration token. The AS further creates routing information directed to the FIDO server, e.g. a redirect URL to the FIDO server.

At block 720, the AS informs the FIDO server of the association information and the authentication information.

At block 730, the AS informs the SIM device of at least the routing information and the authentication information, which is further provided to the terminal device without a SIM card for registration with the FIDO server.

Please note that the above operations in blocks 720 and 730 may be performed in parallel or in a reverse order.

Figure 8:
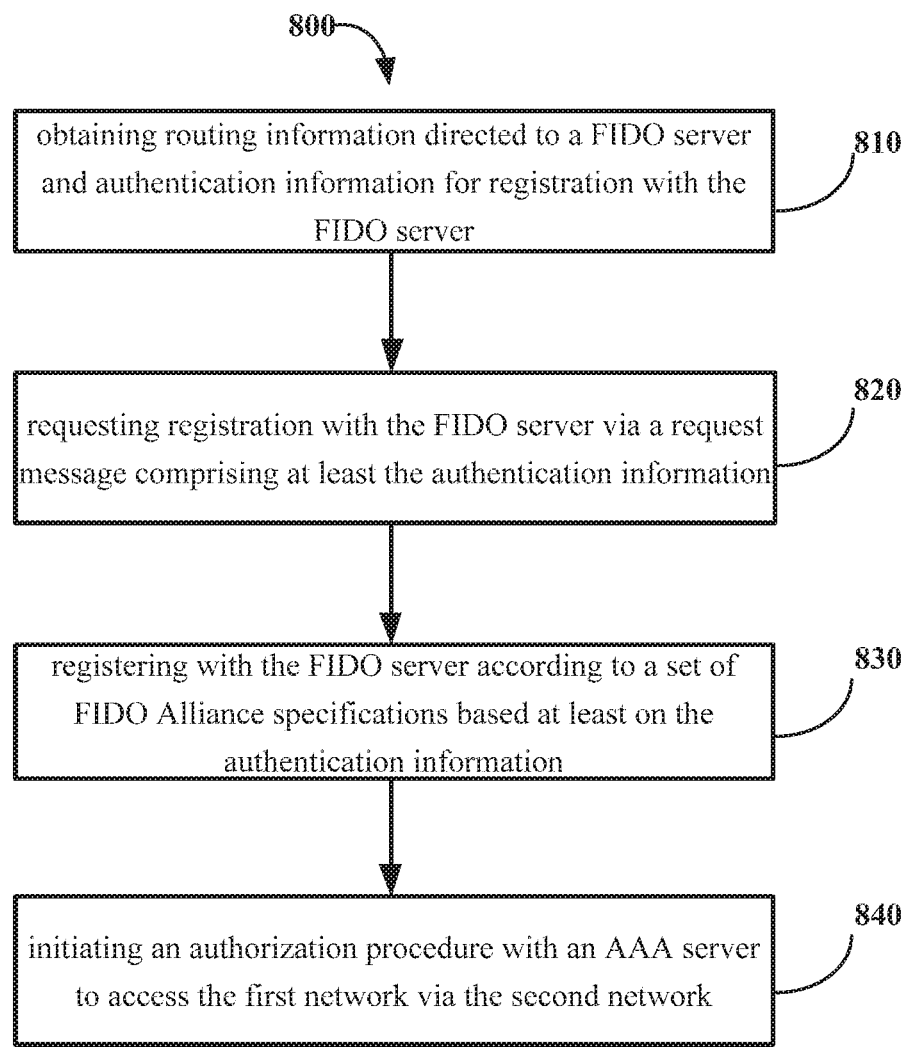
FIG. 8 illustrates a flowchart of a method performed by a terminal device without a SIM card according to some embodiments of the present disclosure.

FIG. 8 illustrates a flowchart of a method 800 performed by a terminal device without a SIM card, e.g. the non-SIM device 112 of FIG. 2, for accessing a first network, e.g. a 3GPP core network, via a second network, e.g. a Wi-Fi network 107 of FIG. 2 according to some embodiments of the present disclosure. The terminal device without a SIM card is FIDO enabled. It shall be appreciated that the second network is not limited to Wi-Fi network and may also include any other radio access network.

As illustrated, at block 810, the terminal device without a SIM card obtains routing information directed to a FIDO server, e.g. a redirect URL, and authentication information, e.g. a registration token, for registration with the FIDO server, e.g. from an application server.

At block 820, the terminal device without a SIM card requests registration with the FIDO server via a request message comprising at least the obtained authentication information.

At block 830, the terminal device without a SIM card registers with the FIDO server according to a set of FIDO Alliance specifications based at least on the authentication information. The set of FIDO Alliance specifications may comprise a set of FIDO Alliance UAF specifications and a set of FIDO Alliance U2F specifications.

At block 840, the terminal device without a SIM card initiates an authentication procedure with an AAA server to access the first network via the second network. Particularly, the authentication procedure may comprise the following operations: receiving FIDO authentication data comprising at least a FIDO challenge, e.g. a FIDO UAF challenge or a FIDO U2F challenge, and a FIDO authentication policy, e.g. a FIDO Alliance UAF policy or a FIDO Alliance U2F policy; verifying the FIDO challenge; performing local authentication according to the FIDO authentication policy; computing an authentication result that is signed with a private key created at the terminal device during the registration with the FIDO server; and then sending the authentication result to the AAA server without a client certificate and a public key created at the terminal device during the registration with the FIDO server.

Figure 9:
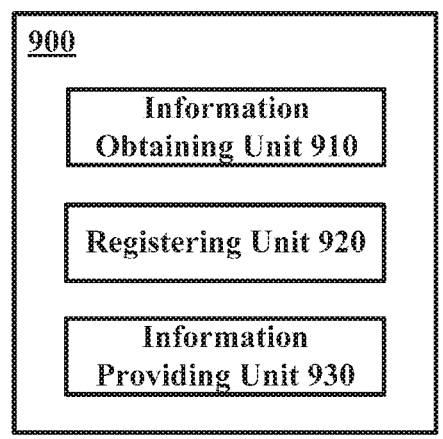
FIG. 9 illustrates a schematic block diagram of an apparatus a FIDO server according to some embodiments of the present disclosure.

FIG. 9 illustrates a schematic block diagram of an apparatus 900 for facilitating a terminal device without a SIM card to access a first network, e.g. a 3GPP core network, via a second network, e.g. a Wi-Fi network, according to some embodiments of the present disclosure. The apparatus 900 may be embodied at or as at least a part of a FIDO server. The terminal device without a SIM card is FIDO enabled. It shall be appreciated that the second network is not limited to Wi-Fi network and may also include any other radio access network. As illustrated, the apparatus 900 comprises an information obtaining unit 910, a registering unit 920 and an information providing unit 930.

Particularly, the information obtaining unit 910 is configured to obtain association information for the terminal device without a SIM card indicative of an association between the terminal device without a SIM card and a user subscription account, and authentication information for the terminal device without a SIM card.

In an embodiment, the user subscription account may correspond to a SIM device. The association information may comprise a user identity shared by the SIM device and the terminal device without a SIM card. The association information and the authentication information may be created at an application server.

The registering unit 920 is configured to cause the terminal device without a SIM card to be registered with the FIDO server according to a set of FIDO Alliance specifications based at least on the association information and the authentication information, in response to receipt of a request for registration with the FIDO server from the terminal device without a SIM card. The request comprises at least the authentication information for the terminal device without a SIM card. For example, the set of FIDO Alliance specifications may comprise a set of FIDO Alliance UAF specifications or a set of FIDO Alliance U2F specifications.

The information providing unit 930 is configured to provide registration information for the terminal device without a SIM card to an AAA server, in response to receipt at the AAA server of an authentication request from the terminal device without a SIM card, so as to facilitate the AAA server to authenticate the terminal device without a SIM card to access the first network via the second network based on the registration information.

In an embodiment, the registering unit 920 may be further configured to verify an identity of the terminal device without a SIM card with the obtained association information and the authentication information so as to trigger the registration with the FIDO server and to add a public key received from the terminal device without a SIM card into the association information.

In this embodiment, the registration information may comprise at least the public key of the terminal device without a SIM card and the association information. Optionally, the registering unit may be further configured to specify a local authentication mechanism for the terminal device without a SIM card. As mentioned above, the local authentication mechanism may include, but not limited to, a biometric authentication mechanism, e.g. fingerprint authentication, face authentication, eye iris authentication, voice recognition and the like, or an authentication mechanism via a second-factor device or via a secure PIN and the like, or any combination thereof.

The above units 910-930 may be configured to implement the corresponding operations or steps as described with reference to FIG. 2, FIG. 3A, FIG. 3B, FIG. 4, and FIG. 5 and thus will not be detailed herein for the sake of brevity.

Figure 10:
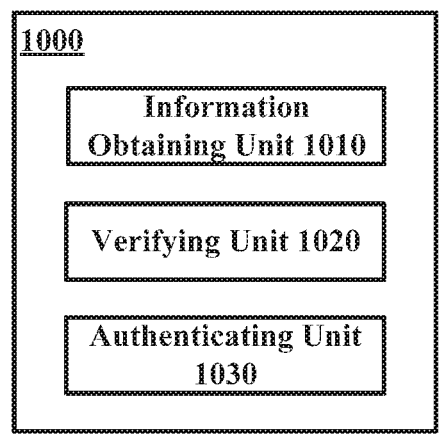
FIG. 10 illustrates a schematic block diagram of an apparatus at an AAA server according to some embodiments of the present disclosure.

FIG. 10 illustrates a schematic block diagram of an apparatus 1000 for facilitating a terminal device without a SIM card to access a first network, e.g. a 3GPP core network, via a second network, e.g. a Wi-Fi network, according to some embodiments of the present disclosure. The apparatus 1000 may be embodied at or as at least a part of an AAA server. The terminal device without a SIM card is FIDO enabled. It shall be appreciated that the second network is not limited to Wi-Fi network and may also include any other radio access network.

As illustrated, the apparatus 1000 comprises an information obtaining unit 1010, a verifying unit 1020 and an authenticating unit 1130.

Particularly, the information obtaining unit 1010 is configured to, in response to receipt of an authentication request from the terminal device without a SIM card, obtain registration information from a FIDO server. The registration information comprises at least association information for the terminal device without a SIM card indicative of an association between the terminal device without a SIM card and a user subscription account. In an embodiment, the user subscription account may correspond to a SIM device. The association information may comprise a user identity shared by the SIM device and the terminal device without a SIM card. The association information and the authentication information may be created at an application server.

The verifying unit 1020 is configured to verify an identity of the terminal device without a SIM card with the obtained registration information so as to trigger authentication of the terminal device without a SIM card by the AAA server.

The authenticating unit 1030 is configured to authenticate the terminal device without a SIM card according to an EAP-TLS protocol extended with FIDO authentication data to access the first network via the second network.

In an embodiment, the authenticating unit 1030 may be further configured to send the FIDO authentication data to the terminal device without a SIM card. In this embodiment, the FIDO authentication data may comprise at least a FIDO challenge and a FIDO authentication policy. For example, the FIDO authentication policy may comprise a FIDO Alliance UAF policy and a FIDO Alliance U2F policy for indicating a local authentication mechanism for the terminal device without a SIM card. The FIDO challenge may comprise a UAF challenge or a U2F challenge. As mentioned above, the local authentication mechanism may include, but not limited to, a biometric authentication mechanism, e.g. fingerprint authentication, face authentication, eye iris authentication, voice recognition and the like, or an authentication mechanism via a second-factor device or via a secure PIN and the like, or any combination thereof.

The above units 1010-1030 may be configured to implement the corresponding operations or steps as described with reference to FIG. 2, FIG. 3A, FIG. 3B, FIG. 4, and FIG. 6 and thus will not be detailed herein for the sake of brevity.

Figure 11:
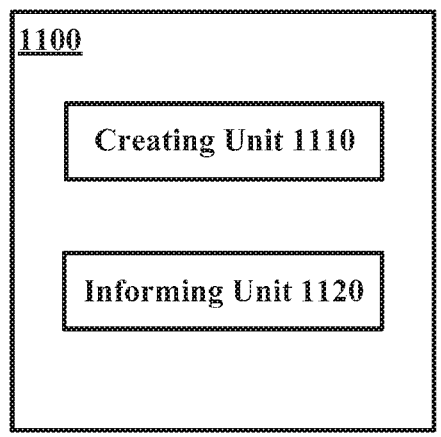
FIG. 11 illustrates a schematic block diagram of an apparatus at an Application Server according to some embodiments of the present disclosure.

FIG. 11 illustrates a schematic block diagram of an apparatus 1100 for facilitating a terminal device without a SIM card to register with a FIDO server according to some embodiments of the present disclosure. The apparatus 1100 may be embodied at or as at least a part of an application server, AS. The terminal device without a SIM card is FIDO enabled.

As illustrated, the apparatus 1100 comprises a creating unit 1110 and an informing unit 1120.

Particularly, the creating unit 1110 is configured to create association information of the terminal device without a SIM card with a SIM device and to create routing information directed to the FIDO server and authentication information for the terminal device without a SIM card to register with the FIDO server.

The informing unit 1120 is configured to inform the FIDO server of the association and the authentication information, and to inform the SIM device of the routing information and the authentication information, which is further provided to the terminal device without a SIM card for registration with the FIDO server.

The above units 1110-1120 may be configured to implement the corresponding operations or steps as described with reference to FIG. 2, FIG. 3A, FIG. 3B, FIG. 4, and FIG. 7 and thus will not be detailed herein for the sake of brevity.

Figure 12:
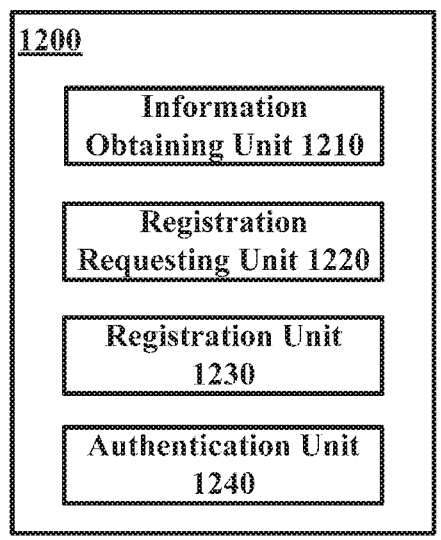
FIG. 12 illustrates a schematic block diagram of an apparatus at a terminal device without a SIM card according to some embodiments of the present disclosure.

FIG. 12 illustrates a schematic block diagram of an apparatus 1200 for facilitating a terminal device without a SIM card to access a first network, e.g. a 3GPP core network, via a second network, e.g. a Wi-Fi network, according to some embodiments of the present disclosure. The apparatus 1200 may be embodied at or as at least part of the terminal device without a SIM card that is FIDO enabled. It shall be appreciated that the second network is not limited to Wi-Fi network and may also include any other radio access network.

As illustrated, the apparatus 1200 comprises an information obtaining unit 1210, a registration requesting unit 1220, a registration unit 1230 and an authentication unit 1240.

Particularly, the information obtaining unit 1210 is configured to obtain routing information directed to a FIDO server and authentication information for registration with the FIDO server.

The registration requesting unit 1220 is configured to request registration with the FIDO server via a request message comprising at least the authentication information.

The registration unit 1230 is configured to register with the FIDO server according to a set of FIDO Alliance specifications based at least on the authentication information. For example, the set of FIDO Alliance specifications may comprise a set of FIDO Alliance UAF specifications or a set of FIDO Alliance U2F specifications.

The authentication unit 1240 is configured to initiate an authentication procedure with an AAA server to access the first network via the second network.

In an embodiment, the authentication unit 1240 may be further configured to receive FIDO authentication data comprising at least a FIDO challenge, e.g. a UAF challenge or a U2F challenge, and a FIDO authentication policy, e.g. a UAF policy or a U2F policy, to verify the FIDO challenge, to perform local authentication according to the FIDO authentication policy, to compute an authentication result signed with a private key created at the terminal device during the registration with the FIDO server, and to send the authentication result to the AAA server without a public key created at the terminal device during the registration with the FIDO server.

The above units 1210-1240 may be configured to implement the corresponding operations or steps as described with reference to FIG. 2, FIG. 3A, FIG. 3B, FIG. 4, and FIG. 8 and thus will not be detailed herein for the sake of brevity.

Figure 13:
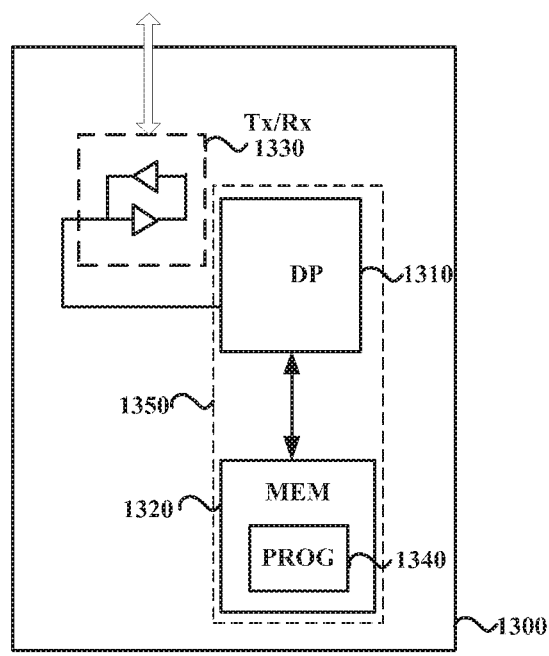
FIG. 13 illustrates a schematic block diagram of an apparatus according to various embodiments of the present disclosure.

FIG. 13 illustrates a schematic block diagram of an apparatus 1300 for facilitating a terminal device without a SIM card to access a first network, e.g. a 3GPP core network, via a second network, a Wi-Fi network, according to embodiments of the present disclosure. In an embodiment, the apparatus 1300 may be embodied as a FIDO server. In a different embodiment, the apparatus 1300 may be embodied as an AAA server. In another different embodiment, the apparatus 1300 may be embodied as an application server. In another different embodiment, the apparatus 1300 may be embodied as the terminal device without a SIM card.

The apparatus 1300 comprises at least one processor 1310, such as a data processor (DP) and at least one memory (MEM) 1320 coupled to the processor 1310. The apparatus 1300 may further comprise a transmitter TX and receiver RX 1330 coupled to the processor 1310 for establishing communications with other apparatuses. The MEM 1320 stores a program (PROG) 1340. A combination of the at least one processor 1310 and the at least one MEM 1320 may form processing means 1350 adapted to implement some embodiments of the present disclosure.

In the embodiment that the apparatus 1300 is embodied as the FIDO server. The PROG 1340 may include instructions that, when executed on the associated processor 1310, enable the apparatus 1300 to operate in accordance with some embodiments of the present disclosure, for example to perform the method 500 as described with reference to FIG. 5A and FIG. 5B. Alternatively, the processing means 1350 may be adapted to implement some embodiments of the present disclosure as described with reference to FIG. 5A and FIG. 5B.

In the embodiment that the apparatus 1300 is embodied as the AAA server. The PROG 1340 may include instructions that, when executed on the associated processor 1310, enable the apparatus 1300 to operate in accordance with some embodiments of the present disclosure, for example to perform the method 600 as described with reference to FIG. 6. Alternatively, the processing means 1350 may be adapted to implement some embodiments of the present disclosure as described with reference to FIG. 6.

In the embodiment that the apparatus 1300 is embodied as the application server. The PROG 1340 may include instructions that, when executed on the associated processor 1310, enable the apparatus 1300 to operate in accordance with some embodiments of the present disclosure, for example to perform the method 600 as described with reference to FIG. 7. Alternatively, the processing means 1350 may be adapted to implement some embodiments of the present disclosure as described with reference to FIG. 7.

In the embodiment that the apparatus 1300 is embodied as the terminal device without a SIM card. The PROG 1340 may include instructions that, when executed on the associated processor 1310, enable the apparatus 1300 to operate in accordance with some embodiments of the present disclosure, for example to perform the method 600 as described with reference to FIG. 9. Alternatively, the processing means 1350 may be adapted to implement some embodiments of the present disclosure as described with reference to FIG. 9.

The MEM 1320 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1310 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, the functional modules/units described as embodiments of the present disclosure may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a Fast Identity Online (FIDO) server for facilitating a terminal device without a Subscriber Identity Module (SIM) card to access a first network via a second network, the terminal device without a SIM card being FIDO enabled, the method comprising:

obtaining association information for the terminal device without a SIM card indicative of an association between the terminal device without a SIM card and a user subscription account and authentication information for the terminal device without a SIM card, wherein the association information comprises a user identity shared by a SIM device and the terminal device without a SIM card;

causing the terminal device without a SIM card to be registered with the FIDO server according to a set of FIDO Alliance specifications based at least on the association information and the authentication information, in response to receipt of a request for registration with the FIDO server from the terminal device without a SIM card, the request comprising at least the authentication information for the terminal device without a SIM card; and providing registration information for the terminal device without a SIM card to an Authentication, Authorization, and Accounting (AAA) server, in response to receipt at the AAA server of an authentication request from the terminal device without a SIM card, so as to facilitate the AAA server to authenticate the terminal device without a SIM card to access the first network via the second network based at least on the registration information.

2. The method according to claim 1, wherein the set of FIDO Alliance specifications comprises one of the following: a set of FIDO Alliance Universal Authentication Framework (UAF) specifications and a set of FIDO Alliance Universal 2nd Factor (U2F) specifications.

3. The method according to claim 1, wherein causing the terminal device without a SIM card to be registered with the FIDO server further comprises:

verifying an identity of the terminal device without a SIM card with the obtained association information and the authentication information so as to trigger the registration with the FIDO server; and adding a public key received from the terminal device without a SIM card into the association information, wherein the registration information comprises at least the public key of the terminal device without a SIM card and the association information.

4. The method according to claim 3, wherein causing the terminal device without a SIM card to be registered with the FIDO server further comprises:

specifying a local authentication mechanism for the terminal device without a SIM card, wherein the local authentication mechanism comprises a biometric authentication mechanism.

5. The method according to claim 1, wherein:

the user subscription account corresponds to the SIM device;

and the association information and the authentication information are created at an application server.

6. A method at an Authentication, Authorization, and Accounting (AAA) server for facilitating a terminal device without a Subscriber Identity Module (SIM) card to access a first network via a second network, the terminal device without a SIM card being Fast Identity Online (FIDO) enabled, the method comprising:

in response to receipt of an authentication request from the terminal device without a SIM card, obtaining registration information from a FIDO server, the registration information comprising at least association information for the terminal device without a SIM card indicative of an association between the terminal device without a SIM card and a user subscription account, wherein the association information comprises a user identity shared by a SIM device and the terminal device without a SIM card;

verifying an identity of the terminal device without a SIM card with the registration information so as to trigger authentication of the terminal device without a SIM card by the AAA server; and authenticating the terminal device without a SIM card according to an Extensible Authentication Protocol-Transport Layer Security (EAP-TLS) protocol extended with FIDO authentication data to access the first network via the second network.

7. The method according to claim 6, wherein authenticating the terminal device without a SIM card according to the EAP-TLS protocol extended with the FIDO authentication data further comprises:

sending the FIDO authentication data to the terminal device without a SIM card, wherein the FIDO authentication data comprises at least a FIDO challenge and a FIDO authentication policy.

8. The method according to claim 7, wherein:

the FIDO authentication policy comprises one of a FIDO Alliance Universal Authentication Framework (UAF) policy and a FIDO Alliance Universal 2nd Factor (U2F) policy for indicating a local authentication mechanism for the terminal device without a SIM card; and the FIDO challenge comprises one of a UAF challenge and a U2F challenge.

9. The method according to claim 8, wherein the local authentication mechanism comprises a biometric authentication mechanism.

10. The method according to claim 6, wherein:

the user subscription account corresponds to the SIM device;

and the association information and the authentication information are created at an application server.

11. A method at a terminal device without a Subscriber Identity Module (SIM) card for facilitating the terminal device without a SIM card to access a first network via a second network, the terminal device without a SIM card being Fast Identity Online (FIDO) enabled, the method comprising:

obtaining routing information directed to a FIDO server and authentication information for registration with the FIDO server;

requesting registration with the FIDO server via a request message comprising at least the authentication information;

registering with the FIDO server according to a set of FIDO Alliance specifications based at least on association information for the terminal device without a SIM card and the authentication information, wherein the association information comprises a user identity shared by a SIM device and the terminal device without a SIM card; and initiating an authentication procedure with an Authentication, Authorization, and Accounting (AAA) server to access the first network via the second network.

12. The method according to claim 11, wherein the set of FIDO Alliance specifications comprises one of the following: a set of FIDO Alliance Universal Authentication Framework (UAF) specifications and a set of FIDO Alliance Universal 2nd Factor (U2F) specifications.

13. The method according to claim 11, wherein the authentication procedure comprises:
- receiving FIDO authentication data comprising at least a FIDO challenge and a FIDO authentication policy;
- verifying the FIDO challenge;
- performing local authentication according to the FIDO authentication policy;
- computing an authentication result that is signed with a private key created at the terminal device without a SIM card during the registration with the FIDO server; and
- sending the authentication result to the AAA server without a public key created at the terminal device without a SIM card during the registration with the FIDO server.

14. A terminal device without a Subscriber Identity Module (SIM) card and being Fast Identity Online (FIDO) enabled, the terminal device without a SIM card comprising a processor and a memory, the memory containing instructions that, when executed by the processor, configure the terminal device without a SIM card to:
- obtain routing information directed to a FIDO server and authentication information for registration with the FIDO server;
- request registration with the FIDO server via a request message comprising at least the authentication information;
- register with the FIDO server according to a set of FIDO Alliance specifications based at least on association information for the terminal device without a SIM card and the authentication information, wherein the association information comprises a user identity shared by a SIM device and the terminal device without a SIM card; and
- initiate an authentication procedure with an Authentication, Authorization, and Accounting (AAA) server to access a first network via a second network.

15. The terminal device without a SIM card according to claim 14, wherein the set of FIDO Alliance specifications comprises one of the following: a set of FIDO Alliance Universal Authentication Framework (UAF) specifications and a set of FIDO Alliance Universal 2nd Factor (U2F) specifications.

16. The terminal device without a SIM card according to claim 14, wherein the authentication procedure comprises:
- receiving FIDO authentication data comprising at least a FIDO challenge and a FIDO authentication policy;
- verifying the FIDO challenge;
- performing local authentication according to the FIDO authentication policy;
- computing an authentication result that is signed with a private key created at the terminal device without a SIM card during the registration with the FIDO server; and
- sending the authentication result to the AAA server without a public key created at the terminal device without a SIM card during the registration with the FIDO server.

* * * * *